United States Patent [19]

Isenberg

[11] 4,395,468
[45] Jul. 26, 1983

[54] FUEL CELL GENERATOR

[75] Inventor: Arnold O. Isenberg, Forest Hills, Pa.

[73] Assignee: Westinghouse Electric Corp., Pittsburgh, Pa.

[21] Appl. No.: 321,137

[22] Filed: Nov. 13, 1981

Related U.S. Application Data

[63] Continuation of Ser. No. 219,185, Dec. 22, 1980, abandoned.

[51] Int. Cl.³ .............................................. H01M 8/12
[52] U.S. Cl. .................................... 429/31; 429/32; 429/34
[58] Field of Search .................. 429/31, 30, 32, 34, 429/38, 39, 29, 33

[56] References Cited

U.S. PATENT DOCUMENTS

| | | | |
|---|---|---|---|
| 3,228,797 | 1/1966 | Brown et al. | 429/31 |
| 3,861,959 | 1/1975 | Cadiou | 429/30 |
| 4,038,462 | 7/1977 | Rohr | 429/30 |

Primary Examiner—Anthony Skapars
Attorney, Agent, or Firm—D. P. Cillo

[57] ABSTRACT

High temperature solid oxide electrolyte fuel cell generators which allow controlled leakage among plural chambers in a sealed housing. Depleted oxidant and fuel are directly reacted in one chamber to combust remaining fuel and preheat incoming reactants. The cells are preferably electrically arranged in a series-parallel configuration.

18 Claims, 7 Drawing Figures

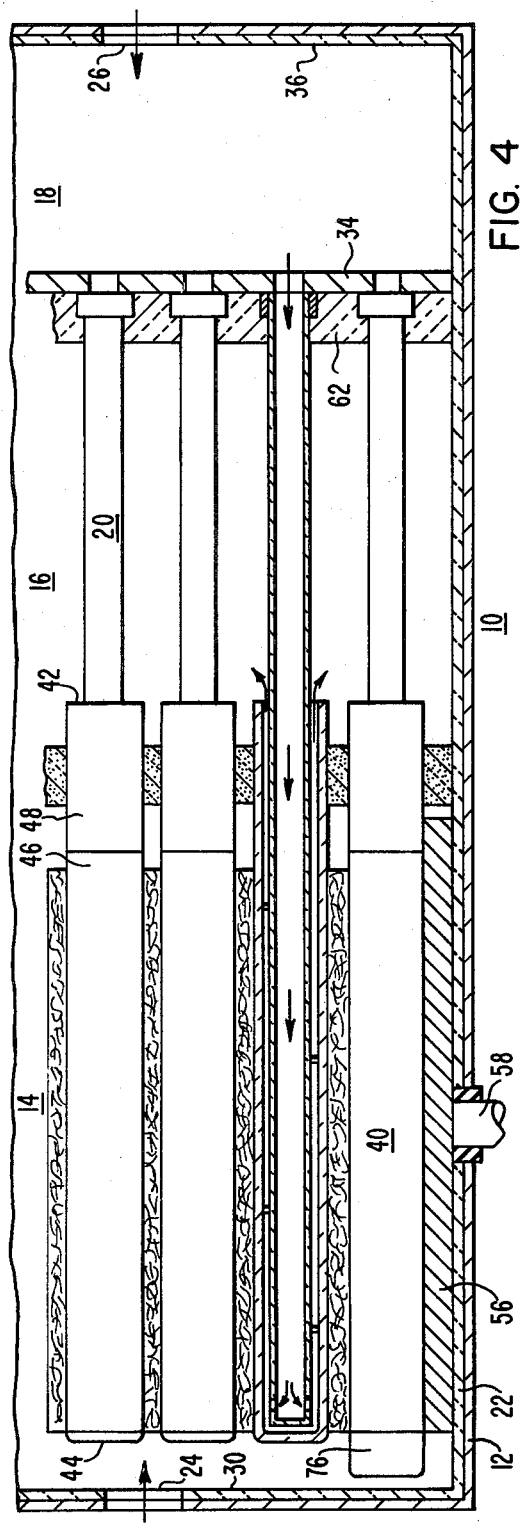
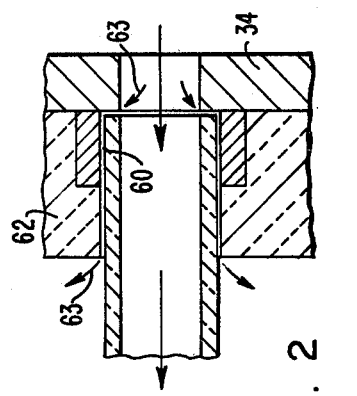
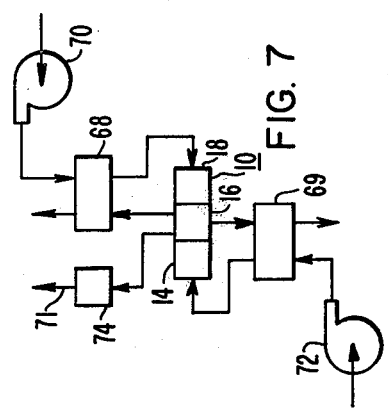
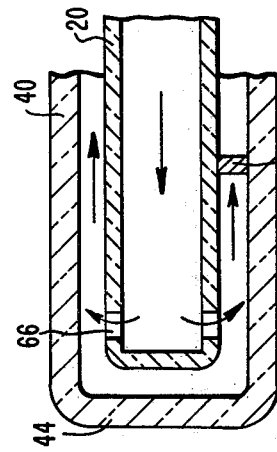

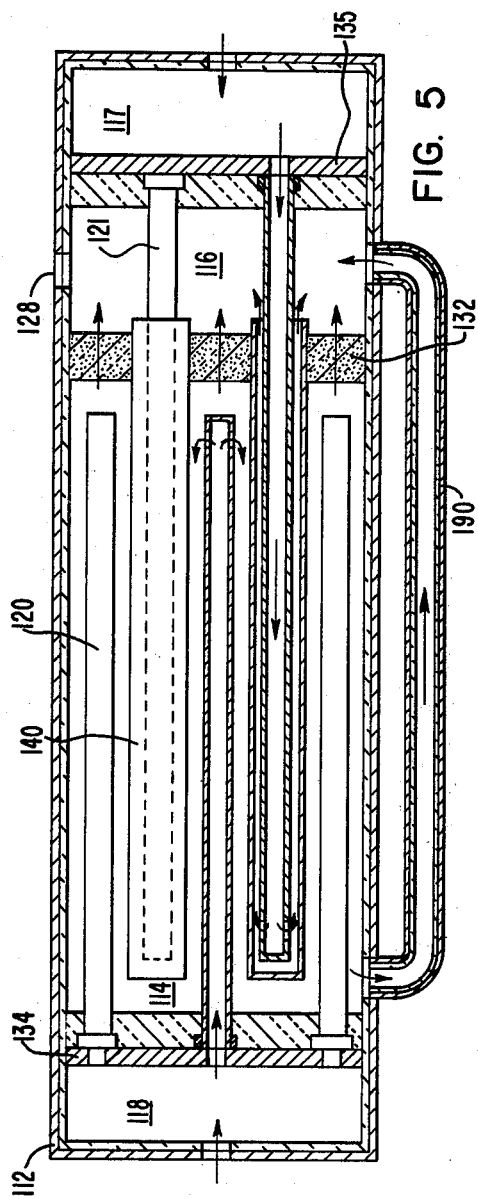
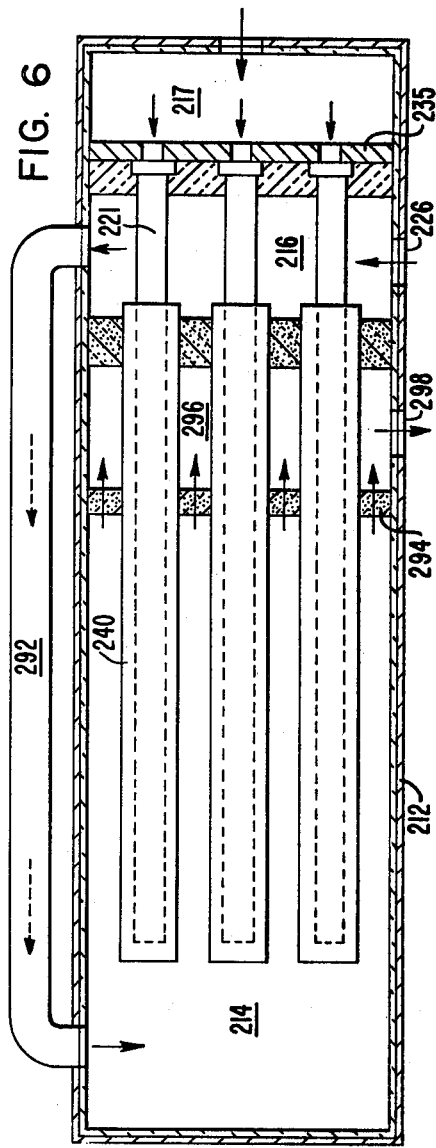

FUEL CELL GENERATOR

GOVERNMENT CONTRACT CLAUSE

This invention was made or conceived in the course of, or under, a contract with the U.S. Department of Energy identified as No. DE-AC-0379-ET-11305.

This is a continuation of application Ser. No. 219,185, filed Dec. 22, 1980, now abandoned.

CROSS-REFERENCE TO RELATED APPLICATION

This application is related to the subject matter of concurrently filed U.S. patent application Ser. No. 323,641 filed Nov. 20, 1981, entitled "High Temperature Solid Electrolyte Fuel Cell Configurations And Interconnections", hereby incorporated by reference. The related application may be referred to for additional information on individual fuel cell structures and interconnections.

BACKGROUND OF THE INVENTION

1. Field of the Invention

This invention relates to solid electrolyte fuel cells, and more particularly provides a generator system comprised of such cells.

2. Description of the Prior Art

High temperature solid electrolyte fuel cells convert chemical energy into direct current electrical energy, typically at temperatures above 700° C. This temperature range is required to render the solid electrolyte sufficiently conductive for low power losses due to ohmic heating. With such cells, expensive electrode catalysts and refined fuels are not required. For example, carbon monoxide-hydrogen fuel mixtures can be used directly, without conversion. Stabilized zirconia is a prime electrolyte candidate, and is used in thin layers on ceramic tubular support structures. The support tubes for thin film high temperature solid electrolyte cells are generally also made of stabilized zirconia and serve as ducts for one of the reactants, fuel or oxidant. This requires porosity in the support tubes.

Many such fuel cells must be connected electrically in series for high voltages, since each cell has a terminal voltage of approximately one volt. A problem arises in the construction of larger generators because the fuel and oxidant, such as air, must be preheated to temperature that require high temperature heat exchangers, such as those comprised of ceramics, a technology that is, for present purposes, economically unavailable.

Large ceramic assemblies for high temperature operation, such as furnaces, usually consist of small building blocks that allow for free thermal expansion and thus alleviate cracking which otherwise could destroy such structures in a uncontrollable manner. It has, therefore, been assumed that high temperature solid oxide electrolyte fuel cells must have construction features similar to existing larger ceramic structures used at high temperatures.

Sealing of such fuel cells has been a related concern because reactants must be separated. This is a result not only of the need to separate the fuel and oxidant to avoid interaction other than electrochemical combustion, but also to avoid harming the electrodes which typically can operate desirably only in either a fuel, or an oxidant, environment.

In such systems, fuel consumption is not complete and five to fifteen percent will remain in the anode exhaust. Similarly, an oxidant, such as air, which typically also functions as a coolant, is depleted in the fuel cells, although the oxygen depletion of air is low. The depleted fuel is not utilized to its full capacity. To date, no economically and technically feasible systems have been proposed for the construction of high temperature solid oxide electrolyte fuel cell generators. Most concepts propose shell and tube heat exchanger type structures which rigidly seal fuel cell tubes either with ceramic or metal-to-ceramic seals. Such seals are complex, and have raised concerns regarding reliability.

It is desirable to provide high temperature solid oxide electrolyte generating systems which alleviate these and other concerns and which provide reliable, efficient means of generating useful energy.

SUMMARY OF THE INVENTION

This invention provides integrated fuel cell electrical generators and heat exchangers which alleviate concerns associated with present generator designs. It provides generators which allow a large degree of freedom in thermal expansion of components, and which eliminate the need for complex sealing arrangements and high temperature heat exchangers.

The disclosed generators eliminate complex seals and allow the fuel and oxidant, in separate but not sealed chambers, to communicate in a controlled manner. Moreover, the communication is primarily between depleted fuel and depleted oxidant, and utilizes the non-electrochemical combustion reaction between the depleted fuel and depleted oxidant, as well as the sensible heat contained in the reaction products, to provide preheating as necessary for the electrochemical combustion. Thus, the generator incorporates a high temperature preheater which eliminates the need for a separate high temperature heat exchanger, and eliminates the need for complex seals.

In preferred form, a housing sealingly surrounds three chambers which communicate among one another through controlled seepage. A fuel inlet, or generator chamber, is separated from a combustion product or preheating chamber by a porous barrier. The combustion product chamber is separated from an oxidant or an air inlet chamber by a tube sheet.

Tubular solid oxide electrolyte fuel cells extend from the combustion product chamber to the generator chamber. The tubular cells are close-ended within the generator chamber, and open-ended within the combustion product chamber. The cells thus pass through and can be partially supported by the porous barrier.

Oxidant carrying conduits are loosely supported at one end by the tube sheet, and extend through the combustion product chamber and into the open ends of the fuel cells. Each conduit corresponds to a single fuel cell and extends through the cell to a point near its closed end. The conduit includes an open end, or discharge holes, near the closed end of the fuel cell, so as to discharge air into the fuel cell.

During operation, preheated air at approximately 600° to 700° C., enters the air inlet chamber and flows into the conduits. The air then passes through the conduit, being heated further in this conduit in the combustion product chamber, and being further heated to about 800° C. in the portion of the conduits within the fuel cells. The air is discharged from the conduit, into the inside of the fuel cells, reverses direction and flows back toward the combustion product chamber. While the air traverses the inside of the fuel cells, the electrochemical reaction takes place, generating direct current electrical energy, heat, and products such as water vapor. The air is then discharged through the open end of the fuel cells into the combustion product chamber.

Fuel enters the generator chamber near the closed end of the fuel cells and flows over the periphery of the cells. The fuel electrochemically reacts with the oxygen from the air, and reaches the porous barrier in depleted form. The hot, depleted fuel diffuses through the barrier, into the combustion product chamber, where it reacts directly with the oxygen depleted air. The sensible heat in the depleted fuel and air, as well as the heat of the reaction, are utilized to preheat the entering air. The products of the direct fuel-air interaction are then discharged from the combustion product chamber, and the heat energy contained in the products can be advantageously utilized, for example, to preheat incoming reactants in conventional metallic heat exchangers.

The tube sheet supporting the air carrying conduits and segregating the air inlet chamber from the combustion product chamber need not be a sealed barrier, since leakage of air into the combustion product chamber merely supports combustion of the depleted fuel and air.

The elongated fuel cells are preferably positioned in a rectangular array forming rows and columns. The cells are electrically interconnected along their axial length in a series-parallel arrangement. The cells in a given row are connected in parallel so as to operate at a common voltage, and the cells of each column are connected in parallel, so as to increase the output voltage. A current-collecting plate is preferably provided at each end of the fuel cell stack.

BRIEF DESCRIPTION OF THE DRAWINGS

The advantages, nature and additional features of the invention will become more apparent from the following description, taken in connection with the accompanying drawings, in which:

FIG. 2 is a section view of a conduit supported in a tube sheet;

FIG. 3 is a section view of a conduit disposed within a fuel cell;

FIG. 4 is a view, partially in section, of a generator such as shown in FIG. 1;

FIG. 5 is a view, partially in section, of another generator in accordance with the invention;

FIG. 6 is a view, partially in section, of yet another generator embodiment; and FIG. 7 is a simplified schematic showing exemplary flow paths of reactants and reaction products.

DESCRIPTION OF THE PREFERRED EMBODIMENT

Figure 1:
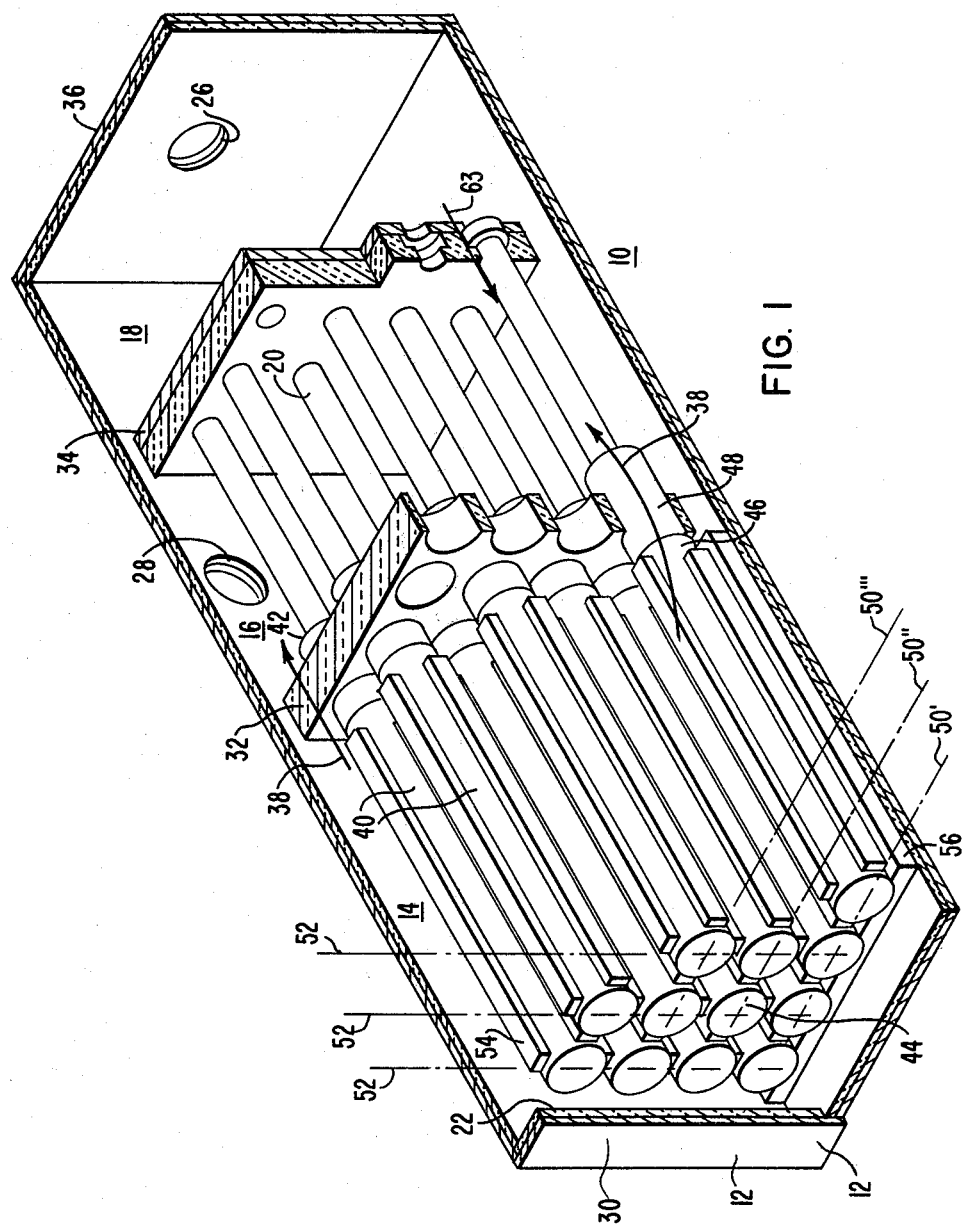
FIG. 1 is a broken prospective view of a fuel cell generator in accordance with the invention.

Referring now to FIGS. 1 and 4, there is shown a fuel cell generator 10 including a gas-tight housing 12. The housing 12 surrounds a plurality of chambers, including a fuel inlet or generating chamber 19 and a combustion product or preheating chamber 16. An oxidant inlet chamber 18 can also be contained within the housing 12. Alternatively, other means for manifolding an oxidant into conduits 20 can be utilized. The housing 12 is preferably comprised of steel, and lined throughout with a thermal insulation 22 such as low density alumina insulation. Penetrating the housing 12 and insulation 22 is a fuel inlet port 24, an air inlet port 26, and a combustion product outlet port 28, as well as ports for electrical leads.

The generating chamber 14 extends between an end wall 30 of the housing 12 and a porous barrier 32. The preheating chamber 16 extends between the porous barrier 32 and a tube support structure such as a tube sheet 34. The oxidant inlet chamber 18 extends between the tube sheet 34 and another end wall 36 of the housing 12. The dividing barriers can include other structural types, and additional support and flow baffles can be incorporated. The shown barriers, the porous barrier 32 and the tube sheet 34, need not be sealed structures. The porous barrier 32, in particular, is designed to allow flow between the generating chamber 14, operating at an approximate pressure slightly above atmospheric, and the preheating chamber 16, operating at a slightly lower pressure, as indicated by arrow 38. While the generator 10 is shown in a horizontal orientation in FIG. 1, it can be operated in a vertical or other position.

High temperature, elongated, solid oxide electrolyte annular fuel cells 40 extend between the preheating chamber 16 and the generating chamber 14. The cells have open ends 42 in the preheating chamber 16, and closed end 44 in the generating chamber 14. The fuel cells are preferably tubular, including a solid oxide electrolyte sandwiched between two electrodes, supported on a tubular porous support. Each cell includes an electrochemically active length 46 and an inactive length 48. The active length is contained within the generating chamber 14. The closed end 44 of the cell is electrochemically inactive, and can serve for final preheating of reactant fuel.

Each individual cell generates approximately one volt, and a plurality are electrically interconnected, preferably in a series-parallel rectangular array. For descriptive purposes, the arrangement can be described as including rows 50 and columns 52. Each cell in a row 50 is electrically connected along its active length 46 to the next adjacent cell, preferably through direct contact of their outer peripheries. For the preferred configuration shown in FIG. 1, where fuel flows about each cell and an oxidant, such as air, flows within each cell, the anode is the outer periphery of each cell and the cathode is on the inside. Thus, cell-to-cell contact within a row is in parallel, among adjacent anodes.

Each cell in a column 52 is electrically interconnected in series to the next adjacent cell 40. In the preferred configuration, this interconnection is made from the inner cathode of one cell to the outer anode of the next consecutive cell, through an interconnect 54. Specific exemplary cells 40 and the interconnect 54 are described more fully in the cross-referenced application.

With the preferred configuration described and shown in FIG. 1, cells in the first row 50' operate, for example, at approximately one volt, in the second row 50" at approximately two volts, in the third row 50''' at approximately three volts, and so forth. Hundreds of cells can be so connected to achieve the desired voltage and current output. The direct current electrical energy thus generated is collected by a single current collector, preferably a conductive metal plate 56 or felt pad, positioned in electrical contact with each cell 40 in the first row 50', and a similar second collector (not shown), positioned in contact with the last row. Electrical leads 58 are accordingly provided to the current collectors.

The conduits 20 are preferably loosely supported at one end in the tube sheet 34 as shown best in FIG. 2.

The tube sheet 34 is preferably stainless steel, with bores 60 that fit loosely about the conduits 20 to allow free thermal expansion. The conduits 20 are preferably comprised of alumina, and the tube sheet is covered with an insulation 62 such as low density alumina. Leakage of oxidant, as indicated by arrow 63, is acceptable.

The conduits 20 extend from the tube sheet 34 into the open end 42 of the fuel cells 40, a single conduit 20 corresponding to a single fuel cell. Each conduit 20 extends to the active length 46 of the fuel cell, and preferably close to the closed end 44 of the cell. This preferred configuration is shown in FIG. 3, the conduit 20 being inserted close to, but spaced from, the closed end 44. Radial supports 64 can be utilized to support each conduit 20 within the corresponding fuel cell 40. The actual support mechanism may be determined based upon the operational orientation of the generator. Each conduit is provided with a means for discharging a reactant medium into the fuel cell 40, such as openings 66. The conduits can also be open ended and spaced from the end 44 of the fuel cell, or can extend into direct contact with the end 44 of the cell, so long as thermal expansion is accommodated.

The porous barrier 32, which allows a throughput of depleted fuel, is preferably a porous ceramic baffle, such as one comprised of fibrous alumina felt, or ceramic plate segments with porous inserts such as ceramic wool plugs, surrounding each fuel cell 40.

During operation an oxidant such as air enters the inlet chamber 18 through inlet port 26. The chamber 18 functions as an inlet manifold for the individual conduits 20. Air enters the conduits at a temperature of approximately 500° to 700° C., and a pressure above atmospheric, being initially heated prior to entering the housing by conventional means such as a heat exchanger 68 (FIG. 7) coupled with a blower 70. The air flows within the conduits, through the preheating chamber 16, where it is further heated to a temperature of approximately 900° C. The air then flows through the length of the conduit, being further heated to approximately 1000° C., and is discharged through the openings 66 into the fuel cell 40. The air within the fuel cell electrochemically reacts at the fuel cell cathode along the active length 46, depleting somewhat in oxygen content as it approaches the open end 42 of the cell. The depleted air is discharged into the combustion product or preheating chamber 16.

A fuel, such as hydrogen or a mixture of carbon monoxide with hydrogen, flows from pumping 72 and preheating 69 apparatus into the generating chamber 14 through fuel inlet port 24. The fuel flows over and about the exterior of the fuel cells, electrochemically reacting at the anode. The fuel inlet port 24 is preferably located near the closed ends 44 of the cells 40, and accordingly depletes as it approaches the porous barrier 32. The depleted fuel, containing approximately five percent to fifteen percent of its initial fuel content, diffuses through the barrier 32 and into the preheating chamber 16.

The combustion products, including oxygen depleted air and fuel, along with any air leaking into the preheating chamber 16 through the tube sheet 34, directly react exothermically. The heat of this reaction, which completely combusts the fuel, along with the sensible heat of the depleted fuel and air, are utilized to preheat the incoming air. The combustion products are discharged through combustion product outlet port 28 at a temperature of approximately 900° C. The remaining energy in the combustion products can be utilized to preheat the incoming air or fuel through, for example, a heat exchanger 68, 69, or to generate steam 71 in conventional generating apparatus 74 (FIG. 7).

Since the preheating chamber 16 functions as a burning chamber for low BTU fuel, it can be provided with structural barriers and baffles to control temperature profiles and enhance the combustion process.

It may also be desirable to preheat the fuel prior to its contacting the active length 46 of the fuel cells 40. As shown in FIG. 4, the fuel cells 40 can include an enlarged inactive section 76 at the fuel entry end of the housing 12, to accomplish this purpose. The pressure in the preheating chamber 16 is lower than that of the generating chamber 14 or oxidant inlet chamber 18 in order to assure controlled directional leakage.

FIGS. 5 and 6 show alternate embodiments of a fuel generator 10, wherein the fuel anode is on the inside of the annular fuel cells and the oxidant cathode is on the outside. Both embodiments utilize the controlled leakage or seal-less arrangement described above. In FIG. 5, four primary chambers are shown within the insulated sealed housing 112, including an oxidant inlet chamber 116, a generating chamber 114, a combustion product chamber 116, and additionally a fuel manifold inlet chamber 117.

Oxidant preheating conduits 120 are mounted in a tube sheet 134, and fuel preheating conduits 121 are mounted in a second tube sheet 135. The mountings, including insulation, can be similar to that described with reference to FIG. 2, allowing thermal expansion and leakage. The fuel conduits 121 extend into annular fuel cells 140, and the air conduits 120 are interspersed among the cells. The fuel conduits 121 can be arranged as rows interspersed among selected groupings of cells. For example, three columns of cells can be interconnected in series-parallel as previously described, and electrically segregated from another grouping of three columns by a column of air conduits. In this case, peripheral electrical collector plates would be associated with each grouping of three columns. Alternatively, the cells can be interconnected among one another, with air conduits placed about the periphery of the entire set of interconnected cells. Additionally, if the cells are of large diameter relative to the diameter of the air conduits, the air conduits can be positioned in the gap between a grouping of, for example, four cells in a square array.

Also utilized is a oxidant feedback duct 190. While the duct 190 is shown external to the housing 112, a flow duct through porous barrier 132, within the housing 112, can also be utilized. The duct represents a preferred flow path, since the pressure in chamber 114 is greater than that in chamber 116, and the resistance along the duct is small.

During operation, preheated oxidant, such as air, enters the oxidant inlet chamber 118, and is manifolded to the conduits 120. The air traverses the conduits 120, being further preheated, and is discharged into generating chamber 114, where it flows about the fuel cells 140 and the electrochemical reaction takes place. The cells include an active length. Depleted air then flows through the feedback duct 190 and into the combustion product chamber 116, for direct combustion with depleted fuel.

Preheated fuel enters fuel inlet chamber 117 and flows through conduits 121, being further preheated. The fuel is then discharged into the fuel cells 140 and flows in the reverse direction reacting in the electrochemical reaction. Depleted fuel is then discharged into the combustion product chamber 116. In the combustion product chamber 116, the depleted fuel, depleted oxidant, fuel which may flow through the tube sheet 135, and oxidant which may flow through the barrier 132, directly react to combust residual fuel and generate heat. The heat of this reaction, along with the sensible heat contained in the depleted fuel and oxidant, preheat the fuel entering through conduits 121. Excess energy discharged with the combustion products through outlet 128 can be advantageously utilized downstream of the generator.

In the generators disclosed, when depleted fuel and other reactants, such as air, are mixed as required for the combustion reaction and cooling, provided by excess air, a gaseous mixture remains after direct combustion containing approximately ten percent oxygen. This level of oxygen content is sufficient to be used as a cathode gas. The embodiment in FIG. 6 makes use of this oxygen content.

As shown in FIG. 6, fuel enters an inlet chamber 217, flows through conduits 221, is discharged into annular cells 240 having internal anodes, and then flows to combustion product chamber 216. Fresh oxidant, such as air, enters the combustion product chamber 216 through inlet 226, where it directly reacts with depleted fuel and fuel passing through the tube sheet 235. The mixture resulting from this direct combustion contains useable amounts of oxygen, and is directed from chamber 216 to a generating chamber 214 through an oxidant duct 292. The oxidant in the mixture electrochemically reacts along the active length of the fuel cells 240. A flow barrier 294, preferably comprised of alumina, directs the remaining mixture into a sub-plenum 296, and out of the housing 212 through an outlet port 298. Diffusion of gases across a porous barrier from combustion product chamber 216 to sub-plenum 296 is likely, and does not detrimentally affect overall generator operation.

Generators in accordance with the seal-less arrangements described are self-starting, since fuel is essentially combusted to provide hot, oxidant-rich gases for the cathode. Additionally, preheated fuel provides the gas for the anode. Also, lean fuel is directly combusted with oxidant in the combustion product chamber to further preheat the oxidant until a load is applied to the cells, at, for example, an active cell temperature of 700° C. Ohmic heating ($I^2R$) in addition to the heat of the electrochemical reaction, including polarization and entropic heat, will bring the generator up to its median operating temperature of approximately 1000° C. at the active area.

Electrical contacts to series-parallel connected cells are made preferably on the fuel side via metal plates, metal rods and felt metal pads. The contacts can be cooled in the feed through point of the external housing below the level where metal oxidation is detrimental. Current collection on the oxidizing side, the cathode, can be accomplished via special alloy current collectors that have conducting and protective oxide scales such as chromium, containing dispersed second phases of rare earth oxides.

Since numerous changes may be made in the above-described arrangement without departing from the spirit and scope thereof, it is intended that all matter contained in the foregoing be interpreted as illustrative, and not in a limiting sense.

I claim:

1. A high temperature solid electrolyte fuel cell generator, comprising:
   a housing means defining a plurality of chambers including a generator chamber and a combustion product chamber;
   a porous barrier separating said generator and combustion product chambers;
   a plurality of elongated annular fuel cells, each having an electrochemically active length disposed within said generator chamber;
   means for flowing a first gaseous reactant through said annular fuel cells and through said porous barrier into said combustion product chamber;
   means for flowing a second gaseous reactant into said generator chamber, about said fuel cells, and through said porous barrier into said combustion product chamber; and
   means for segregating said first and second gaseous reactants from direct contact with one another prior to entry of each into said combustion product chamber.

2. A high temperature solid electrolyte fuel cell generator, comprising:
   a housing means defining a plurality of chambers including a generator chamber and a combustion product chamber;
   a porous barrier separating said generator and combustion product chambers;
   a plurality of elongated annular fuel cells, each having a closed end and an open end, said open end disposed within said combustion product chamber, said cells extending from said open end through said porous barrier and into said generator chamber;
   a conduit for each said cell, each said conduit extending into a portion of each said cell disposed within said generator chamber, each said conduit having means for discharging a first gaseous reactant within said fuel cell;
   means for flowing said first gaseous reactant into each said conduit; and
   means for flowing a second gaseous reactant into said generator chamber.

3. The generator of claim 2 wherein said porous barrier comprises a ceramic felt.

4. The generator of claim 2 further comprising a first reactant chamber, said first reactant chamber being adjacent and separated from said combustion product chamber by a tube sheet, and wherein said means for flowing said first gaseous reactant into each said conduit comprises an inlet into said first reactant chamber.

5. The generator of claim 2 wherein an end of each said conduit is positioned closely adjacent said closed end of each corresponding cell, and wherein said means for discharging a first gaseous reactant within each said fuel cell includes an opening in each said conduit.

6. The generator of claim 2 wherein each said fuel cell has an inactive section extending from said open end, through said porous barrier and into said generator chamber, an electrochemically active section extending from said inactive section to a selected position within said generator chamber, and another inactive section extending from said selected position to the end of said cell.

7. A high temperature solid oxide electrolyte fuel cell generator, comprising:

a housing means defining a plurality of chambers including a fuel inlet chamber, a combustion chamber, and an oxidant inlet chamber;

a porous barrier being the boundary between said fuel chamber and said combustion chamber;

a support structure being the boundary between said combustion chamber and said oxidant inlet chamber;

a plurality of annular solid oxide electrolyte fuel cells having an electrochemically active length and a closed end disposed within said fuel inlet chamber, said cells extending through said porous barrier and having an open end disposed within said combustion chamber;

means for collecting current generated by said plurality of fuel cells;

a plurality of oxidant inlet conduits in fluid communication with said oxidant inlet chamber and supported by said support plate, each said conduit extending into, and having an oxidant outlet disposed within, a corresponding fuel cell;

means for supplying fuel to said fuel inlet chamber;

means for supplying an oxidant to said oxidant inlet chamber; and means for exhausting combustion products from said combustion chamber;

whereby oxidant supplied to said oxidant inlet chamber flows through said conduits and into said fuel cells through said oxidant outlets, then flows within the interior of said annular fuel cells being depleted by electrochemical combustion, and is discharged as depleted oxidant into said combustion chamber, and fuel supplied to said fuel inlet chamber flows about the exterior of said fuel cells being depleted by electrochemical combustion and through said porous barrier as depleted fuel and into said combustion chamber, said depleted fuel and oxidant reacting and being exhausted from said combustion chamber.

8. A fuel cell generator comprising:
(1) a plurality of tubular fuel cells having an open end, a closed end and an active length therebetween, said active length comprising an inner electrode, an outer electrode and an electrolyte between said electrodes;
(2) a tubular supply conduit for a first gaseous reactant extending into a fuel cell through said open end, said conduit adapted to discharge said first reactant within the interior of said cell for flow along the active length of the inner electrode and out the open end of the fuel cell; and
(3) means for flowing a second gaseous reactant about the active length of said outer electrode.

9. The fuel cell generator of claim 8 further comprising means for heating the first gaseous reactant in said tubular supply conduit.

10. The fuel cell generator of claim 8 further comprising a combustion chamber communicating with the open end of said fuel cells.

11. The fuel cell generator of claim 10 further comprising means for flowing said second gaseous reactant into the combustion chamber.

12. The fuel cell generator of claim 10 wherein a portion of said tubular supply conduit is disposed within said combustion chamber.

13. The fuel cell generator of claim 10 wherein the closed end of the fuel cell is electrochemically inactive, and is effective to heat the second gaseous reactant flowing about the outer electrode.

14. A fuel cell generator comprising:
a plurality of elongated tubular fuel cell elements and an elongated tubular reactant conduit extending into each of said plurality of cells, means defining a preheating chamber including a first member supporting said fuel cell elements and a second member supporting said reactant conduits, a portion of said conduits extending through said preheating chamber.

15. The fuel cell generator of claim 14 wherein said second member is a tube sheet having bores that fit loosely about said conduits.

16. The fuel cell generator of claim 14 further comprising means for supplying a first gaseous reactant to said reactant conduit.

17. The fuel cell generator of claim 14 wherein the tubular fuel cells comprise an inner electrode, an outer electrode and a solid oxide electrolyte between said electrodes.

18. The fuel cell generator of claim 16 wherein said first member comprises a means for defining a chamber for a second gaseous reactant adjacent said preheating chamber and is adapted to allow a throughput of depleted second reactant.

* * * * *